US006524377B2

(12) United States Patent
Torii et al.

(10) Patent No.: US 6,524,377 B2

(45) Date of Patent: Feb. 25, 2003

(54) REVERSIBLE THERMOSENSITIVE COLORING COMPOSITION AND RECORDING MATERIAL USING THE COMPOSITION AND RECORDING METHOD USING THE RECORDING MATERIAL

(75) Inventors: Masafumi Torii, Shizuoka (JP); Hiroaki Matsui, Numazu (JP); Masaru Shimada, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/768,724

(22) Filed: Jan. 24, 2001

(65) Prior Publication Data

US 2001/0025587 A1 Oct. 4, 2001

Related U.S. Application Data

(62) Division of application No. 09/251,209, filed on Feb. 16, 1999, now Pat. No. 6,207,613.

(30) Foreign Application Priority Data

Feb. 17, 1998 (JP) .......................................... 10-051477
May 15, 1998 (JP) .......................................... 10-152296

(51) Int. Cl.$^7$ ............................................... C09D 11/00
(52) U.S. Cl. ............................................... 106/31.18
(58) Field of Search ...................................... 106/31.18

(56) References Cited

U.S. PATENT DOCUMENTS 4,880,768 A 11/1989 Mochizuki et al. ......... 503/227
5,019,550 A 5/1991 Suzuki et al. ............... 503/227
5,049,538 A 9/1991 Mochizuki et al. ......... 503/227

(List continued on next page.)

FOREIGN PATENT DOCUMENTS

EP 0492628 * 12/1991

*Primary Examiner*—Mark L. Bell
*Assistant Examiner*—Veronica F. Faison
(74) *Attorney, Agent, or Firm*—Cooper & Dunham LLP

(57) ABSTRACT

A reversible thermosensitive coloring composition including an electron donating coloring agent and an electron accepting color developer, wherein the composition achieves a colored state when heated at a temperature not lower than a coloring temperature and then cooled at a cooling speed (a), and the composition in the colored state achieves a non-colored state when heated at a temperature lower than the coloring temperature and not lower than an erasing temperature, or when heated at a temperature not lower than the coloring temperature and then cooled relatively slowly compared to the cooling speed (a), and wherein the electron accepting color developer includes a phenolic compound having the following formula (1):

(1)

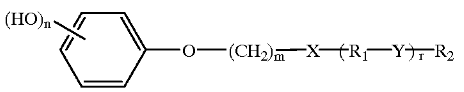

wherein n is an integer of from 1 to 3; m is an integer of from 1 to 20; r is 0 or an integer of from 1 to 3; X and Y independently represent a divalent group including a hetero atom; $R_1$ represents a hydrocarbon group having from 1 to 20 carbon atoms; and $R_2$ represents a hydrocarbon group having from 2 to 20 carbon atoms. A reversible thermosensitive recording material having a recording layer including the composition is also provided. In addition, a reversible thermal recording method using the reversible thermosensitive recording material is also provided.

1 Claim, 1 Drawing Sheet

U.S. PATENT DOCUMENTS 5,143,893 A 9/1992 Mochizuki et al. ......... 503/227
5,144,334 A 9/1992 Suzuki et al. ................ 346/1.1
5,306,687 A 4/1994 Furuya et al. .............. 503/207
5,380,693 A 1/1995 Goto .......................... 503/200
5,395,815 A * 3/1995 Ikeda et al. ................. 503/216
5,403,810 A 4/1995 Sawamura et al. ......... 503/201
5,472,931 A 12/1995 Morohoshi et al. ......... 503/227
5,489,501 A 2/1996 Torii et al. .................. 430/341
5,498,772 A * 3/1996 Maruyama et al. ......... 503/216
5,521,138 A 5/1996 Shimada et al. ............ 503/209
5,532,201 A 7/1996 Goto .......................... 503/213
5,547,500 A 8/1996 Tsutsui ..................... 106/21 A
5,641,724 A 6/1997 Yamaguchi et al. ........ 503/221
5,703,005 A 12/1997 Torii et al. .................. 503/201
5,739,077 A 4/1998 Goto et al. ................. 503/200
5,741,752 A 4/1998 Goto et al. ................. 503/221
5,866,505 A 2/1999 Furuya et al. .............. 503/201
5,868,821 A 2/1999 Torii et al. ............... 106/31.17
5,891,823 A 4/1999 Torii et al. .................. 503/216
5,932,516 A 8/1999 Torii et al. .................. 503/216
5,942,377 A 8/1999 Torii et al. .................. 430/338
5,955,225 A 9/1999 Furuya et al. ................ 430/19
5,981,115 A 11/1999 Furuya et al. ................ 430/19
5,981,429 A 11/1999 Kawamura et al. ......... 503/207
6,001,159 A 12/1999 Furuya et al. ........... 106/31.17
6,090,192 A 7/2000 Torii et al. ............... 106/31.18
6,090,748 A 7/2000 Furuya et al. .............. 503/201
6,184,180 B1 2/2001 Maruyama et al. ......... 503/216

* cited by examiner

REVERSIBLE THERMOSENSITIVE COLORING COMPOSITION AND RECORDING MATERIAL USING THE COMPOSITION AND RECORDING METHOD USING THE RECORDING MATERIAL

CROSS REFERENCE TO RELATED APPLICATION

This application is a division of applicants' U.S. patent application Ser. No. 09/251,209, filed Feb. 16, 1999, now U.S. Pat. No. 6,207,613 B1.

BACKGROUND OF THE INVENTION

1. Field of the Invention

The present invention relates to a reversible thermosensitive coloring composition which utilizes a coloring reaction of an electron donating coloring agent and an electron accepting color developer, a reversible thermosensitive recording material which uses the coloring composition and in which a colored image is repeatedly formed and erased by appropriately heating and cooling the reversible thermosensitive recording material, and a reversible thermal recording method using the recording material.

2. Discussion of the Related Art

A variety of thermosensitive recording materials are well known in which a colored image can be formed by a coloring reaction when an electron donating coloring agent is brought into contact with an electron accepting color developer while heat or the like is applied thereto.

The thermosensitive recording materials have the following advantages over other conventional recording materials:

(1) color images can be rapidly recorded by a relatively simple apparatus without using such complicated steps as developing and fixing;

(2) color images can be recorded without producing noise and environmental pollution;

(3) various color images, e.g., red, blue, violet and black, can be easily obtained;

(4) image density and background whiteness are high; and (5) the manufacturing cost is relatively low.

Because of these advantages, the above-described thermosensitive recording materials can be widely used, not only as a recording material for price labels in stores, but also as recording materials for copiers, printers for computers, facsimiles, automatic vending machines of tickets, video printers and measuring instruments.

However, the coloring reaction of these thermosensitive recording materials is irreversible and accordingly these recording materials cannot be repeatedly used.

Several thermosensitive recording materials which can reversibly form and erase an image have been proposed. For example, they are as follows:

(1) a thermosensitive recording material which includes gallic acid in combination with phloroglucinol serving as color developers (Japanese Laid-Open Patent Publication No. 60-193691);

(2) a thermosensitive recording material which includes phenolphthalein or Thymolphthalein serving as a color developer (Japanese Laid-Open Patent Publication No. 61-237684);

(3) a thermosensitive recording material which includes an uniform solid solution of a coloring agent, a color developer and a carboxylic acid ester (Japanese Laid-Open Patent Publications No. 62-138556, 62-138568 and 62-140881);

(4) a thermosensitive recording material which includes an ascorbic acid derivative serving as a color developer (Japanese Laid-Open Patent Publication No. 63-173684); and (5) a thermosensitive recording material which includes bis(hydroxyphenyl)acetic acid or a higher aliphatic amine salt of gallic acid serving as a color developer (Japanese Laid-Open Patent Publication No. 2-188294).

Some of the present inventors, jointly with others, have proposed a reversible thermosensitive coloring composition which includes a coloring agent such as a leuco dye and a color developer such as an organic phosphate compound, an aliphatic carboxylic acid compound or a phenolic compound each of which has a long-chain aliphatic hydrocarbon group, and a reversible thermosensitive recording material using the coloring composition (Japanese Laid-Open Patent Publication No. 5-124360). The reversible thermosensitive recording material can stably repeat image formation and image erasure by being appropriately heated and cooled, and the image-recorded state or the image-erased state can be stably maintained at room temperature. In addition, Japanese Laid-Open Patent Publication No. 6-210954 has disclosed a reversible thermosensitive recording material which includes a specified phenolic compound having a long-chain aliphatic hydrocarbon group serving as a color developer.

Thus, reversible thermosensitive recording materials have been proposed; however, these recording materials do not have requisite properties such as quick erasability and good preservability when they are preserved under various environmental conditions or when light is irradiated thereto.

Because of these reasons, a need exists for a reversible thermosensitive recording material which has good image formation/erasure ability and rapid erasability, and particularly has good preservability even when preserved under high temperature conditions.

SUMMARY OF THE INVENTION

Accordingly, an object of the present invention is to provide a reversible thermosensitive coloring composition which has good color formation/erasure ability, rapid color erasability, and good preservability even when preserved under high temperature conditions.

Another object of the present invention is to provide a reversible thermosensitive recording material which has good image formation/erasure ability and rapid image erasability, and particularly has good preservability even when preserved under high temperature conditions.

Yet another object of the present invention is to provide a reversible thermosensitive recording material which has good durability even when repeatedly used for a long time.

Still another object of the present invention is to provide a reversible thermal recording method in which images having good image qualities are rapidly formed and erased even when images are repeatedly formed and erased for a long time.

To achieve such objects, the present invention contemplates the provision of a reversible thermosensitive coloring composition including an electron donating coloring agent and an electron accepting color developer and in which an image is reversibly formed and erased by appropriately heating and cooling the composition, wherein the composition includes a phenolic compound having the following formula (1) as the electron accepting color developer.

(1)

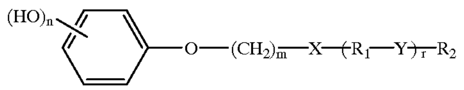

wherein X and Y independently represents a divalent group including a hetero atom; $R_1$ represents a divalent hydrocarbon group having from 1 to 20 carbon atoms; $R_2$ represents a divalent hydrocarbon group having from 2 to 20 carbon atoms; and n and m are an integer of from 1 to 3, and from 1 to 20, respectively; and r is 0 or an integer of from 1 to 3.

In another aspect of the present invention, a reversible thermosensitive recording material is provided which includes a recording layer including the thermosensitive coloring composition and which can reversibly record a color image by being appropriately heated at a temperature not lower than a coloring temperature and erase the image by being heated at a temperature lower than the coloring temperature and not lower than an erasing temperature. Preferably, the recording layer further includes a crosslinked resin, and a color formation/erasure controlling agent having a hetero atom and an alkyl group having carbon atoms not less than 6.

In yet another aspect of the present invention, a reversible thermal recording method is provided, including the steps of discoloring by heating the recording layer of the reversible thermosensitive recording material of the present invention at a temperature lower than a coloring temperature and not lower than an erasing temperature to allow the recording layer to achieve a non-colored state and recording by imagewise heating the recording layer at a temperature not lower than the coloring temperature to form a colored image in the recording layer.

These and other objects, features and advantages of the present invention will become apparent upon consideration of the following description of the preferred embodiments of the present invention taken in conjunction with the accompanying drawing.

DESCRIPTION OF THE PREFERRED EMBODIMENTS

Figure 1:
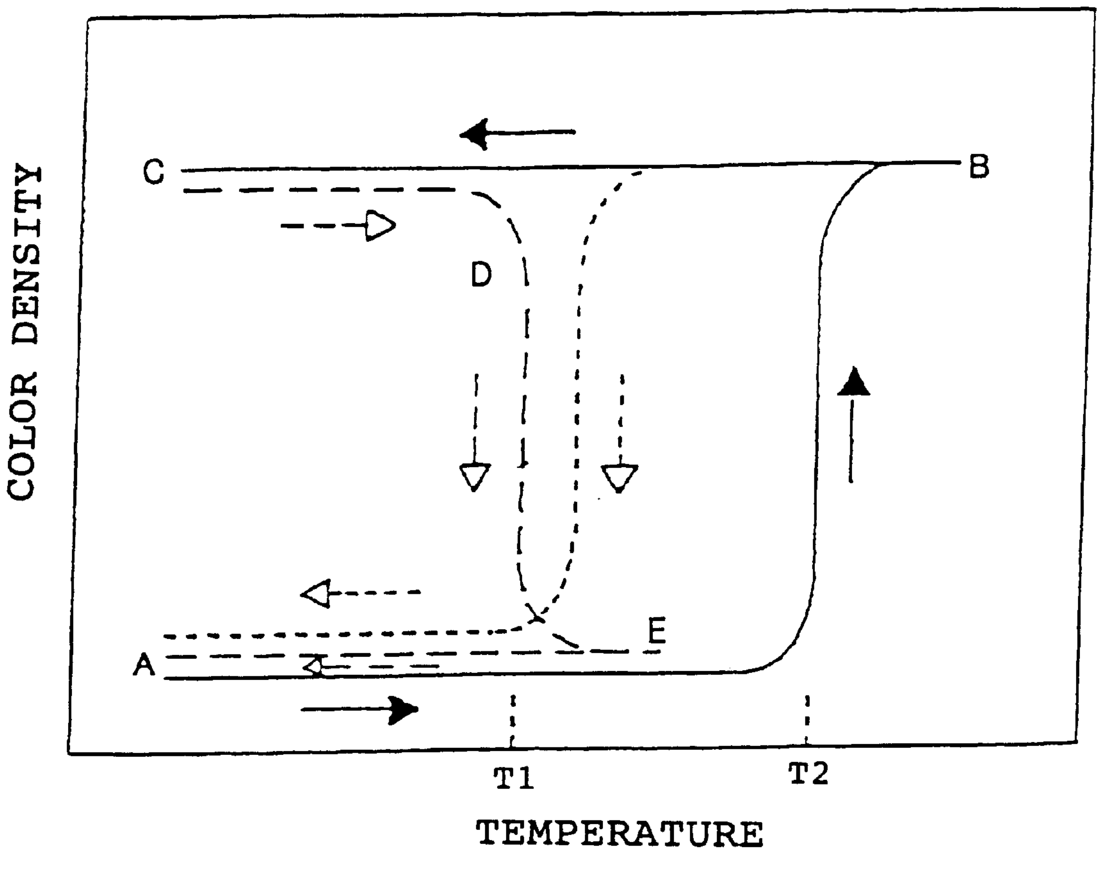
FIG. 1 is a graph illustrating the color formation/erasure characteristics of a reversible thermosensitive coloring composition of the present invention.

FIG. 1 is a graph illustrating the relationship between temperature of a reversible thermosensitive coloring composition and color density thereof. When the coloring composition which is in a non-colored state (A) is heated, the coloring composition begins to color at an coloring temperature T1 in which at least one of an electron donating coloring agent and an electron accepting color developer is melted and then achieves a melted colored state (B). If the coloring composition in the melted colored state (B) is rapidly cooled to room temperature, the coloring composition keeps the colored state and achieves a cooled colored state (C) in which the electron donating coloring agent and the electron accepting color developer are almost solidified. It depends upon cooling speed whether the coloring composition remains in the colored state, and if the coloring composition is gradually cooled, the coloring composition returns to the non-colored state (A) (a dotted line B-A) or achieves a semi-colored state in which the color density of the coloring composition is relatively low compared to the color density of the coloring composition in the cooled colored state (C). If the coloring composition in the cooled colored state (C) is heated again, the coloring composition begins to discolor at an erasing temperature T2 lower than T1 and achieves a non-colored state (E) (a broken line C-D-E). If the coloring composition in the non-colored state (E) is cooled to room temperature, the coloring composition returns to the non-colored state (A). The temperatures T1 and T2 depend on the materials of the coloring agent and the color developer. Accordingly, by appropriately selecting a coloring agent and a color developer, a coloring composition having desired T1 and T2 can be obtained. The color densities of the coloring composition in the colored states (B) and (C) are not necessarily the same. In addition, a suitable cooling speed for rapid cooling and gradual cooling changes depending on the formulation of the coloring composition.

In the colored state (C), the coloring composition includes the coloring agent and the color developer which form a solid in which a molecule of the coloring agent and a molecule of the color developer are mixed while contacting with each other. Namely, the coloring agent and the color developer cohere while they are reacting with each other, resulting in maintenance of the colored state. It is considered that the colored state (C) is stable because the semi-stable cohered structure of the coloring agent and the color developer is formed. On the other hand, in the non-colored state, at least one of the coloring agent and the color developer aggregates to form a domain, or crystallizes; thereby each phase of the coloring agent and the color developer which has a stable adhered structure is isolated from the other, and accordingly the coloring composition is stably in the non-colored state. In the coloring compositions of the present invention, the cohered structure of the coloring agent and the color developer is changed to a state in which the phases of the coloring agent and the color developer are isolated from the other and the color developer crystallizes; thereby color erasure can be perfectly performed. Namely, in the color erasure process of going from the colored state (B) to the non-colored state (A) when the coloring compositions are gradually cooled or going from the colored state (C) to the non-colored state (A) via the states (D) and (E) in FIG. 1, this structure change occurs at the erasing temperature T2. The more stable the semi-stable cohered structure and the stable cohered structure of a coloring composition, the better the preservability of formed color products and the erasability of the coloring composition.

The reversible thermosensitive coloring composition of the present invention includes an electron donating coloring agent and an electron accepting color developer and in which color formation/erasure is reversibly performed by appropriately heating and cooling the composition, wherein the composition includes a phenolic compound having the following formula (1) as the electron accepting color developer.

(1)

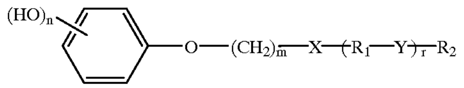

wherein X and Y independently represent a divalent group including a hetero atom; $R_1$ represents a divalent hydrocarbon group having from 1 to 20 carbon atoms; $R_2$ represents a divalent hydrocarbon group having from 2 to 20 carbon atoms; and n and m are an integer of from 1 to 3, and from 1 to 20, respectively; and r is 0 or an integer of from 1 to 3.

In the reversible color formation and erasure phenomenon of a reversible thermosensitive coloring composition including a coloring agent and a color developer, it is important to balance the developing ability of a color developer and a cohesive force of molecules of the color developer. The present inventors have examined various types of color developers and finally discovered the specified phenolic compounds mentioned above.

At first, the phenolic compounds having formula (1) are described in detail.

In the phenolic compounds having formula (1), $R_1$ represents a divalent hydrocarbon group having from 1 to 20 carbon atoms. The hydrocarbon group may be an aliphatic hydrocarbon group or an aromatic hydrocarbon group, or a combination of an aliphatic hydrocarbon group and an aromatic hydrocarbon group. The aliphatic hydrocarbon group may be linear or branched, and may include an unsaturated bond. In addition, the hydrocarbon group may include a substituent such as a halogen atom, a hydroxy group, an alkoxy group or the like.

Suitable groups for use as $R_1$ include the following groups in Table 1:

TABLE 1

| | | |
|---|---|---|
| $—(CH_2)q—$ | $—(CH_2)q—CH{=}CH—(CH_2)q'—$ | 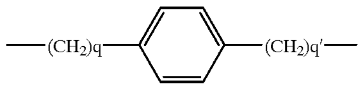 |
| 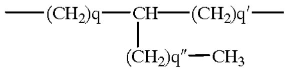 | 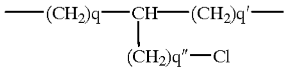 | |
| 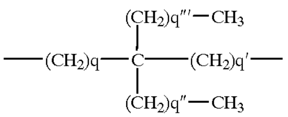 | 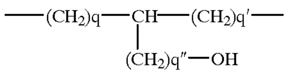 | |

Among these groups, the group $—(CH_2)_q—$ is more preferable.

The group R2 represents a divalent hydrocarbon group having from 2 to 20 carbon atoms. The hydrocarbon group may be an aliphatic hydrocarbon group or an aromatic hydrocarbon group, or a combination of an aliphatic hydrocarbon group and an aromatic hydrocarbon group. The aliphatic hydrocarbon group may be linear or branched, and may include an unsaturated bond. In addition, the hydrocarbon group may include a substituent such as a halogen atom, a hydroxy group, an alkoxy group or the like.

Suitable groups for use as $R_2$ include the following groups in Table 2:

TABLE 2

| | |
|---|---|
| $—(CH_2)s—CH_3$ | $—(CH_2)s—CH{=}CH—(CH_2)s'—CH_3$ |
| 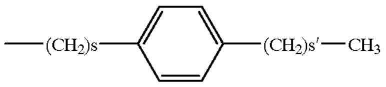 | 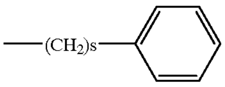 |
| 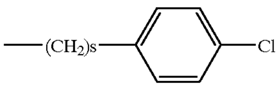 | 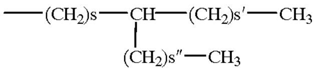 |
| 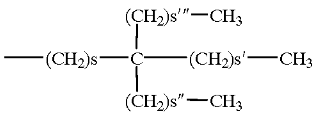 | 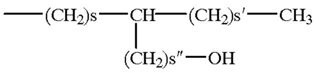 |

Among these groups, the group $—(CH_2)_s—CH_3$ is more preferable.

In formula (1), the total of the integer m and the carbon numbers of the groups $R_1$ and $R_2$ is preferably not less than 8, and more preferably not less than 11, to stably form and erase color images. Therefore, q, q', q", q'", s, s', s" and s'" is independently an integer, wherein the carbon numbers of the groups $R_1$ and $R_2$ satisfy the conditions mentioned above.

The groups X and Y represent a divalent group having a hetero atom. Suitable groups for use as the groups X and Y include a divalent group including one or more of the following groups: —NH—, —CO—, —O—, —$SO_2$—, and —S—.

Specific examples of the groups X and Y include the groups as shown in Table 3.

TABLE 3

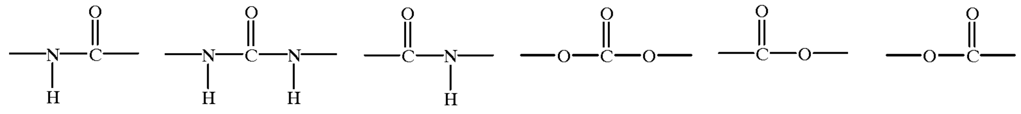

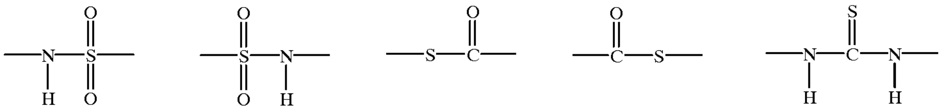

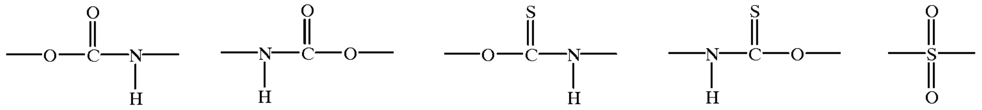

—CH=N—

—N=CH—

—O—

—S—

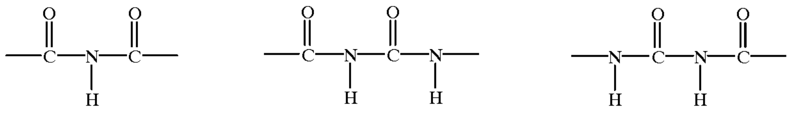

—SS—

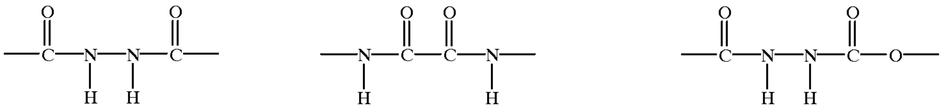

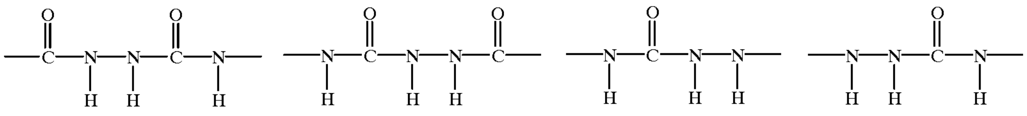

Suitable phenolic compounds for use as the electron accepting color developer in the present invention include the compounds having the following formulas:

(2)

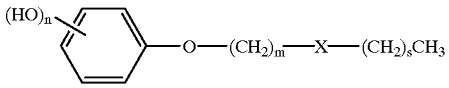

(3)

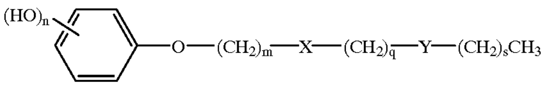

(4)

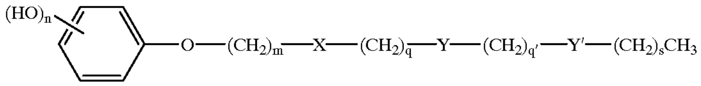

(5)

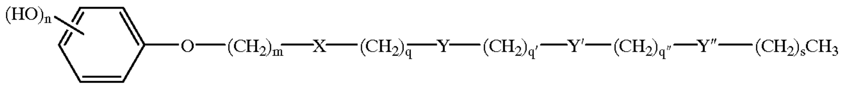

wherein m, q, q', q" and s independently an integer of from 0 to 20. The total number of these integers is not less than 8. The groups Y' and Y" independently represent a divalent group including a hetero atom.

Specific examples of the phenolic compounds having formula (2) or (3) for use in the present invention include the compounds as shown in Table 4. Specific examples of phenolic compounds having formula (4) or (5) for use in the present invention include compounds similar to the compounds as shown in Table 4, but are not shown in a table. The phenolic compounds for use in the present invention are not limited thereto.

TABLE 4

| n | m | X | q | Y | s |
|---|---|---|---|---|---|
| 1(p-) | 1 | —NHCO— | 0 | — | 16 |
| 1(p-) | 2 | —NHCO— | 0 | — | 16 |
| 1(p-) | 2 | —NHCONH— | 0 | — | 16 |
| 1(p-) | 3 | —NHCONH— | 0 | — | 16 |
| 1(p-) | 1 | —NHCONHSO$_2$— | 0 | — | 16 |
| 1(p-) | 3 | —NHCOO— | 0 | — | 16 |
| 1(p-) | 1 | —NHCSO— | 0 | — | 16 |
| 1(p-) | 1 | —NHCSNH— | 0 | — | 16 |
| 1(p-) | 2 | —CONH— | 0 | — | 16 |
| 1(p-) | 1 | —CONH— | 0 | — | 16 |
| 1(p-) | 3 | —COO— | 0 | — | 16 |
| 1(p-) | 8 | —O— | 0 | — | 16 |
| 1(p-) | 1 | —CONH— | 0 | — | 16 |
| 1(p-) | 2 | —CONHNH— | 0 | — | 16 |
| 1(p-) | 3 | —OCONH— | 0 | — | 16 |
| 1(p-) | 2 | —OCO— | 0 | — | 16 |
| 1(p-) | 1 | —NHCO— | 2 | —NHCO— | 16 |
| 1(p-) | 2 | —NHCO— | 3 | —NHCONH— | 5 |
| 1(p-) | 1 | —NHCO— | 4 | —NHCONH— | 17 |
| 1(p-) | 1 | —NHCO— | 5 | —OCONH— | 17 |
| 1(p-) | 2 | —NHCO— | 4 | —CONH— | 17 |
| 1(p-) | 2 | —NHCO— | 4 | —O— | 17 |
| 1(p-) | 2 | —NHCO— | 4 | —SO$_2$— | 17 |
| 1(p-) | 6 | —CONH— | 5 | —CONHCO— | 12 |
| 1(p-) | 1 | —CONH— | 4 | —NHCONH— | 17 |
| 1(p-) | 2 | —CONH— | 2 | —NHCO— | 16 |
| 1(p-) | 4 | —CONH— | 6 | —NHCOO— | 11 |
| 1(p-) | 1 | —CONH— | 6 | —SO$_2$— | 11 |
| 1(p-) | 1 | —CONH— | 6 | —S— | 11 |
| 1(p-) | 1 | —COO— | 2 | —NHCO— | 16 |
| 1(p-) | 1 | —COO— | 3 | —CONH— | 16 |
| 1(p-) | 3 | —CONHCO— | 10 | —COO— | 12 |
| 1(p-) | 2 | —CONHCO— | 6 | —NHCONH— | 17 |
| 1(p-) | 5 | —NHCOO— | 10 | —NHCO— | 12 |

The reversible thermosensitive recording material of the present invention includes a recording layer which includes the reversible thermosensitive coloring composition of the present invention and which is formed overlying a substrate. Namely, the recording layer includes one or more of the color developers mentioned above and one or more coloring agents having an electron donating property.

To obtain good preservability and quick erasability, the recording layer of the reversible thermosensitive recording material of the present invention preferably includes a compound having a divalent group including a hetero atom and an alkyl group having carbon atoms not less than 6 as a color formation/erasure controlling agent. Suitable compounds for use as the color formation/erasure controlling agent include compounds having the following formula (A):

$$(R_6)_a X_1-R_5-(X_2-R_3)_h-(X_3)_g-(R_4)_b \quad (A)$$

wherein $X_1$, $X_2$ and $X_3$ independently represent a group including a hetero atom; $R_5$, $R_6$, $R_3$ and $R_4$ independently represent a hydrocarbon group having from 1 to 22 carbon atoms which may include a substituent or a heterocyclic ring, wherein at least one of $R_6$ and $R_4$ has not less than 6 carbon atoms; and a, b and g are independently 0 or 1, and h is 0 or an integer of from 1 to 4, provided that at least one of a, b, g and h is not 0, and wherein when h is 2 or more, each of $R_3$ may be the same or different from each other and each of $X_2$ may be the same or different from each other.

Preferably, the number of carbon atoms of the groups, $R_5$, $R_6$, $R_3$ and $R_4$ is not less than 8. In addition, $R_5$, $R_6$, $R_3$ and $R_4$ independently represent a hydrocarbon group, which may be an aliphatic hydrocarbon group or an aromatic hydrocarbon group and may include a substituent such as a hydroxy group, a halogen atom, an alkoxy group or the like. The aliphatic hydrocarbon group may be linear or branched and which may include an unsaturated bond. Further, the total carbon number of $R_5$, $R_6$, $R_3$ and $R_4$ is preferably not less than 8, and more preferably not less than 11, to obtain a color formation/erasure controlling agent having good color formation/erasure ability. Suitable groups for use as the groups, $R_5$ and $R_3$, include the following groups:

$—(CH_2)_q—$ $—(CH_2)_qCH{=}CH(CH_2)_{q'}—$

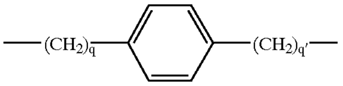

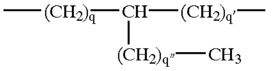

-continued

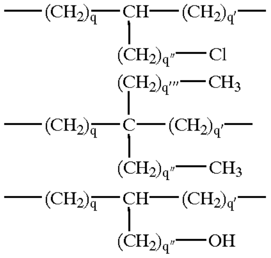

wherein q, q', q" and q'" independently represent an integer not greater than the carbon number of $R_5$ or $R_3$ which is determined depending on the total carbon number of $R_5$, $R_6$, $R_3$ and $R_4$.

In addition, suitable groups for use as the groups $R_6$ and $R_4$ include the following groups:

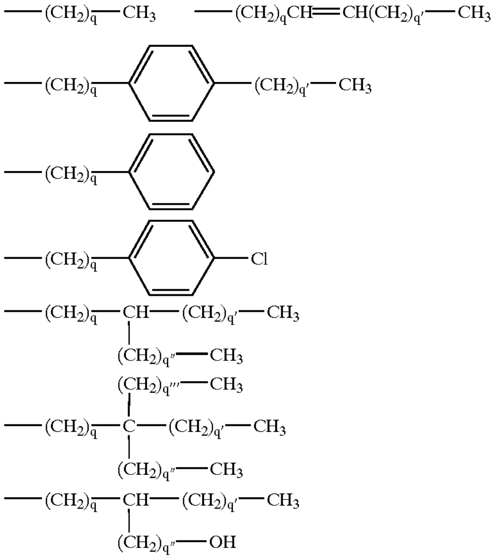

wherein q, q', q" and q'" independently represent an integer not greater than the carbon number of $R_6$ or $R_4$ which is determined depending on the total carbon number of $R_5$, $R_6$, $R_3$ and $R_4$.

If the groups $X_1$ and $X_3$ are positioned at a terminal of the formulas, suitable groups for use as the groups $X_1$ and $X_3$ include groups having one or more of the following groups: —NH—, —CO—, —O—, —$SO_2$— and —S—.

Specific examples of the groups include the following groups:

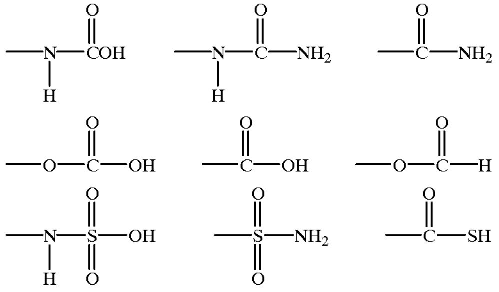

-continued

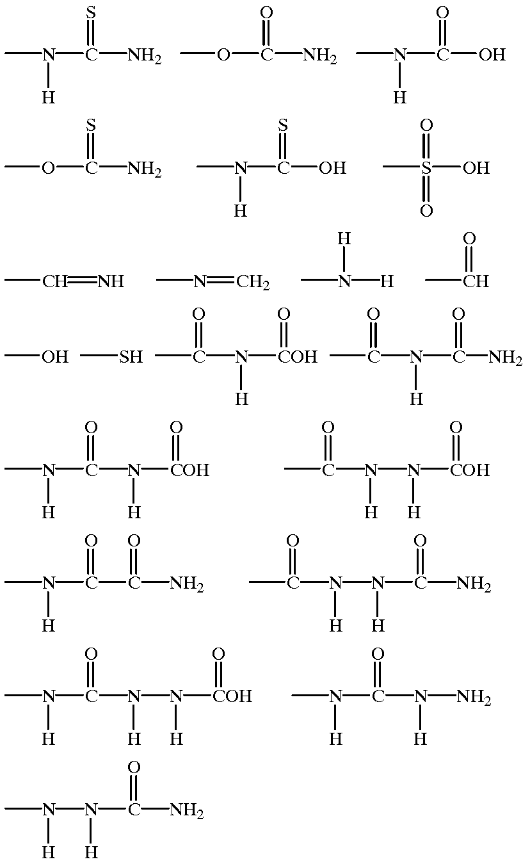

Suitable groups for use as the groups, $X_1$, $X_2$ and $X_3$ include a divalent group including the following groups: —NH—, —CO—, —O—, —$SO_2$— and —S—.

Specific examples of the divalent groups include the following groups:

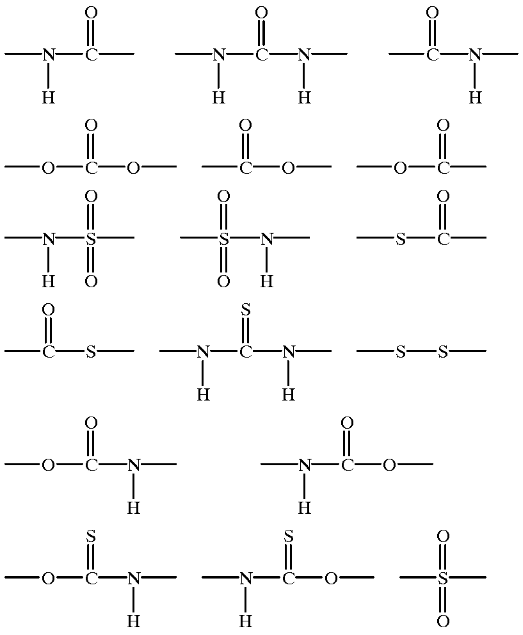

-continued

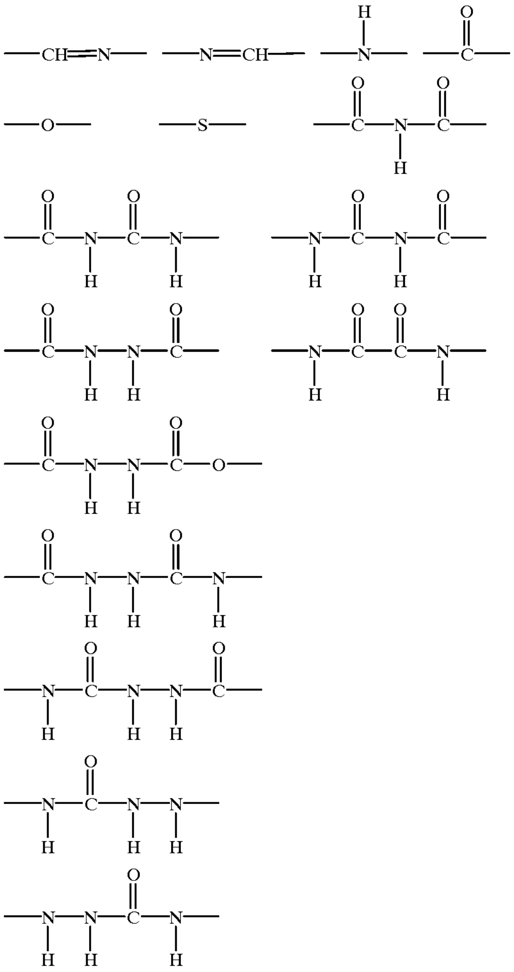

Among these color formation/erasure controlling agents having formula (A), compounds having the following formula (a), (b) or (c) are preferable, but the color formation/erasure controlling agents for use in the present invention are not limited thereto:

$X_1—R_5\text{-}(X_2—R_3)_h—X_3$ (a)

$R_6—X_1—R_5\text{-}(X_2—R_3)_h\text{-}X_3$ (b)

$R_5\text{-}(X_2—R_3)_h\text{-}(X_3)_g\text{-}(R_4)_b$ (c)

wherein $R_5$, $R_6$, $R_3$, $R_4$, $X_1$, $X_2$ and $X_3$ independently represent one of the groups defined above in formula (A); h is 0 or an integer of from 1 to 4, and when h is 2 or greater, each of repeating $R_3$ and $X_2$ may be the same or different from each other, respectively; and g is 0 or an integer of from 1 to 4, provided that at least one of h and g is not 0.

Among these color formation/erasure controlling agents having formula (a), (b) or (c), compounds having the following formula (d), (e), (f), (g), (h) or (i) are more preferable.

$X_1—(CH_2)_q—X_3$ (d)

$X_1—(CH_2)_q—X_2\text{-}[(CH_2)_{q''}—X_3]_h$ (e)

$CH_3(CH_2)_{q''}—X_1—(CH_2)_q—X_3$ (f)

$CH_3(CH_2)_{q''}—X_1—(CH_2)_q\text{-}[X_2—(CH_2)_{q''}]_h\text{-}X_3$ (g)

$CH_3(CH_2)_q—X_3—(CH_2)_{q'''}CH_3$ (h)

$CH_3(CH_2)_q\text{-}[X_2—(CH_2)_{q''}]_h\text{-}X_3—(CH_2)_{q'''}CH_3$ (i)

Specific examples of the color formation/erasure controlling agents having formula (h) include the following compounds shown in Table A-1.

TABLE A-1

| |
|---|
| $CH_3(CH_2)$q—NHCONH—$(CH_2)$q'$CH_3$ |
| $CH_3(CH_2)$q—NHCO—$(CH_2)$q'$CH_3$ |
| $CH_3(CH_2)$q—NHCOCONH—$(CH_2)$q'$CH_3$ |
| $CH_3(CH_2)$q—NHCONHNH—$(CH_2)$q'$CH_3$ |
| $CH_3(CH_2)$q—$NHSO_2NH$—$(CH_2)$q'$CH_3$ |
| $CH_3(CH_2)$q—NHCOO—$(CH_2)$q'$CH_3$ |
| $CH_3(CH_2)$q—NHCO—$(CH_2)$q"—NHCONH—$(CH_2)$q'"$CH_3$ |
| $CH_3(CH_2)$q—OCO—$(CH_2)$q"—NHCONH—$(CH_2)$q'"$CH_3$ |
| $CH_3(CH_2)$q—O—$(CH_2)$q"—NHCONH—$(CH_2)$q'"$CH_3$ |
| $CH_3(CH_2)$q—NHNHCO—$(CH_2)$q"—NHCONH—$(CH_2)$q'"$CH_3$ |
| $CH_3(CH_2)$q—$NHSO_2$—$(CH_2)$q"—NHCONH—$(CH_2)$q'"$CH_3$ |
| $CH_3(CH_2)$q—NHCONH—$(CH_2)$q"—NHCONH—$(CH_2)$q'"$CH_3$ |
| $CH_3(CH_2)$q—NHCOCONH—$(CH_2)$q"—NHCONH—$(CH_2)$q'"$CH_3$ |
| $CH_3(CH_2)$q—NHCO—$(CH_2)$q"—NHCO—$(CH_2)$q'"$CH_3$ |
| $CH_3(CH_2)$q—OCO—$(CH_2)$q"—NHCO—$(CH_2)$q'"$CH_3$ |
| $CH_3(CH_2)$q—O—$(CH_2)$q"—NHCO—$(CH_2)$q'"$CH_3$ |
| $CH_3(CH_2)$q—NHNHCO—$(CH_2)$q"—NHCO—$(CH_2)$q'"$CH_3$ |
| $CH_3(CH_2)$q$NHSO_2$—$(CH_2)$q"—NHCO—$(CH_2)$q'"$CH_3$ |
| $CH_3(CH_2)$q—NHCONH—$(CH_2)$q"—NHCO—$(CH_2)$q'"$CH_3$ |
| $CH_3(CH_2)$q—NHCOCONH—$(CH_2)$q"—NHCO—$(CH_2)$q'"$CH_3$ |
| $CH_3(CH_2)$q—NHCO—$(CH_2)$q"—NHCO—$(CH_2)$q'"$CH_3$ |
| $CH_3(CH_2)$q—NHCO—$(CH_2)$q"—CONH—$(CH_2)$q'"$CH_3$ |
| $CH_3(CH_2)$q—NHCO—$(CH_2)$q"—NHCOCONH—$(CH_2)$q'"$CH_3$ |
| $CH_3(CH_2)$q—NHCO—$(CH_2)$q"—NHCONHNH—$(CH_2)$q'"$CH_3$ |
| $CH_3(CH_2)$q—NHCO—$(CH_2)$q"—NHCONHNHCO—$(CH_2)$q'"$CH_3$ |

Specific examples of the color formation/erasure controlling agent having formula (i) include compounds similar to the compounds shown in Table A-1.

More specifically, specific examples of the compounds having formulas, $CH_3(CH_2)_q$—NHCONH—$(CH_2)_q$'$CH_3$, and $CH_3(CH_2)_q$—NHCONH—$(CH_2)_q$"—NHCONH—$(CH_2)_q$'"$CH_3$, which are shown in Table A-1 include the compounds shown in Table A-2.

TABLE A-2

| |
|---|
| $CH_3(CH_2)_{17}$—NHCONH—$CH_3$ |
| $CH_3(CH_2)_{17}$—NHCONH—$(CH_2)_2CH_3$ |
| $CH_3(CH_2)_{17}$—NHCONH—$(CH_2)_3CH_3$ |
| $CH_3(CH_2)_{17}$—NHCONH—$(CH_2)_4CH_3$ |
| $CH_3(CH_2)_{17}$—NHCONH—$(CH_2)_5CH_3$ |
| $CH_3(CH_2)_{17}$—NHCONH—$(CH_2)_6CH_3$ |
| $CH_3(CH_2)_{17}$—NHCONH—$(CH_2)_7CH_3$ |
| $CH_3(CH_2)_{17}$—NHCONH—$(CH_2)_8CH_3$ |
| $CH_3(CH_2)_{17}$—NHCONH—$(CH_2)_9CH_3$ |
| $CH_3(CH_2)_{17}$—NHCONH—$(CH_2)_{10}CH_3$ |
| $CH_3(CH_2)_{17}$—NHCONH—$(CH_2)_{11}CH_3$ |
| $CH_3(CH_2)_{17}$—NHCONH—$(CH_2)_{15}CH_3$ |
| $CH_3(CH_2)_{17}$—NHCONH—$(CH_2)_{17}CH_3$ |
| $CH_3(CH_2)_{17}$—NHCONH—$(CH_2)_{21}CH_3$ |
| $CH_3(CH_2)_{15}$—NHCONH—$(CH_2)_4CH_3$ |
| $CH_3(CH_2)_{21}$—NHCONH—$(CH_2)_2CH_3$ |
| $CH_3(CH_2)_{21}$—NHCONH—$(CH_2)_3CH_3$ |
| $CH_3(CH_2)_{21}$—NHCONH—$(CH_2)_4CH_3$ |
| $CH_3(CH_2)_{21}$—NHCONH—$(CH_2)_{17}CH_3$ |
| $CH_3(CH_2)_{17}$—NHCONH—$(CH_2)_{12}$—NHCONH—$(CH_2)_{17}CH_3$ |
| $CH_3(CH_2)_{17}$—NHCONH—$(CH_2)_6$—NHCONH—$(CH_2)_{17}CH_3$ |
| $CH_3(CH_2)_{17}$—NHCONH—$(CH_2)_2$—NHCONH—$(CH_2)_{17}$ |
| $CH_3(CH_2)_{21}$—NHCONH—$(CH_2)_6$—NHCONH—$(CH_2)_{21}CH_3$ |
| $CH_3(CH_2)_{21}$—NHCONH—$(CH_2)_{12}$—NHCONH—$(CH_2)_{21}CH_3$ |
| $CH_3(CH_2)_{21}$—NHCONH—$(CH_2)_6$—NHCONH—$(CH_2)_{21}CH_3$ |
| $CH_3(CH_2)_{21}$—NHCONH—$(CH_2)_3$—NHCONH—$(CH_2)_{21}CH_3$ |
| $CH_3$—NHCONH—$(CH_2)_{12}$—NHCONH—$CH_3$ |

TABLE A-2-continued

| |
|---|
| $CH_3(CH_2)_2$—NHCONH—$(CH_2)_{18}$—NHCONH—$(CH_2)_2CH_3$ |
| $CH_3$—NHCONH—$(CH_2)_6$—NHCONH—$(CH_2)_{17}CH_3$ |
| $CH_3(CH_2)_5$—NHCONH—$(CH_2)_6$—NHCONH—$(CH_2)_5CH_3$ |
| $CH_3(CH_2)_5$—NHCONH—$(CH_2)_{12}$—NHCONH—$(CH_2)_5CH_3$ |

Suitable compounds for use as the electron donating coloring agent in the present invention include known colorless or pale colored dye precursors (leuco dyes) such as phthalide compounds, azaphthalide compounds, fluoran compounds, phenothiazine compounds, leuco auramine compounds and the like.

Among these compounds, compounds having the following formulas (2), (4) or (5) are preferable:

(2)

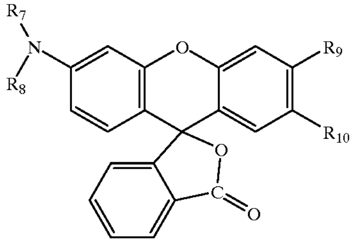

wherein $R_7$ and $R_8$ independently represent an alkyl group having from 1 to 6 carbon atoms, an aryl group which may be substituted, or a hydrogen atom, wherein $R_7$ and $R_8$ may combine to form a ring; $R_9$ represents an alkyl group having from 1 to 6 carbon atoms, a halogen atom or a hydrogen atom; and $R_{10}$ represents an alkyl group having from 1 to 6 carbon atoms, a halogen atom, a hydrogen atom or a substituted anilino group having the following formula (3):

(3)

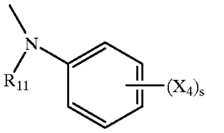

wherein $R_{11}$ represents an alkyl group having from 1 to 6 carbon atoms, or a hydrogen atom; $X_4$ represents an alkyl group having from 1 to 6 carbon atoms, or a halogen atom; and s is 0 or an integer of from 1 to 3.

(4)

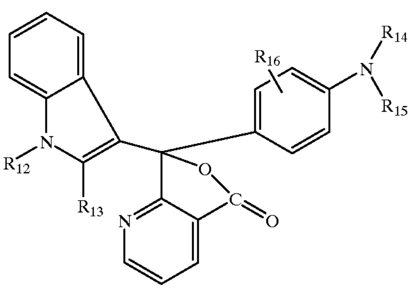

wherein $R_{12}$, $R_{13}$, $R_{14}$ and $R_{15}$ independently represent an alkyl group or a hydrogen atom; and $R_{16}$ represents an alkyl group, an alkoxy group or a hydrogen atom.

(5)

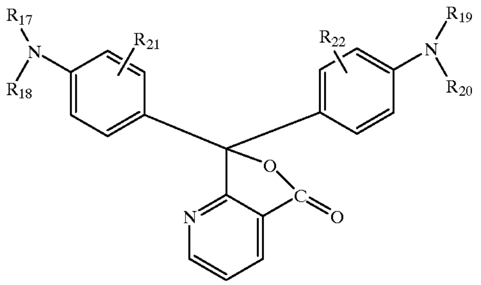

wherein $R_{17}$, $R_{18}$, $R_{19}$ and $R_{20}$ independently represent an alkyl group having from 1 to 6 carbon atoms, or a hydrogen atom; and $R_{21}$ and $R_{22}$ independently represent an alkyl group, an alkoxy group or a hydrogen atom.

Specific examples of the coloring agent for use in the recording material of the present invention include the following compounds, but are not limited thereto.

2-anilino-3-methyl-6-diethylaminofluoran,
2-anilino-3-methyl-6-(di-n-butylamino)fluoran,
2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-sec-butyl-N-methylamino)fluoran,
2-anilino-3-methyl-6-(N-n-amyl-N-ethylamino)fluoran,
2-anilino-3-methyl-6-(N-n-isoamyl-N-ethylamino)fluoran,
2-anilino-3-methyl-6-(N-n-propyl-N-isopropylamino)fluoran,
2-anilino-3-methyl-6-(N-cyclohexyl-N-methylamino)fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylaminofluoran,
2-(m-trifluoromethylanilino)-3-methyl-6-diethylaminofluoran,
2-(m-trichloromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino)fluoran,
2-(N-ethyl-p-toluidino)-3-methyl-6-(N-propyl-p-toluidino)fluoran,
2-anilino-6-(N-n-hexyl-N-ethylamino)fluoran,
2-(o-chloroanilino)-6-diethylaminofluoran,
2-(o-chloroanilino)-6-dibutylaminofluoran,
2-(m-trifluoromethylanilino)-6-diethylaminofluoran,
2,3-dimethyl-6-dimethylaminofluoran,
3-methyl-6-(N-ethyl-p-toluidino)fluoran,
2-chloro-6-diethylaminofluoran,
2-bromo-6-diethylaminofluoran,
2-chloro-6-dipropylaminofluoran,
3-chloro-6-cyclohexylaminofluoran,
3-bromo-6-cyclohexylaminofluoran,
2-chloro-6-(N-ethyl-N-isoamylamino)fluoran,
2-chloro-3-methyl-6-diethylaminofluoran, 2-anilino-3-chloro-6-diethylaminofluoran,
2-(o-chloroanilino)-3-chloro-6-cyclohexylaminofluoran,
2-(m-trifluoromethylanilino)-3-chloro-6-diethylaminofluoran,
2-(2,3-dichloroanilino)-3-chloro-6-diethylaminofluoran,
1,2-benzo-6-diethylaminofluoran,
3-diethylamino-6-(m-trifluoromethylanilino)fluoran,
3-(1-ethyl-2-methylindole-3-yl)-3-(2-ethoxy-4-diethylaminophenyl)-4-azaphthalide,
3-(1-ethyl-2-methylindole-3-yl)-3-(2-ethoxy-4-diethylaminophenyl)-7-azaphthalide,
3-(1-octyl-2-methylindole-3-yl)-3-(2-ethoxy-4-diethylaminophenyl)-4-azaphthalide,
3-(1-ethyl-2-methylindole-3-yl)-3-(2-methyl-4-diethylaminophenyl)-4-azaphthalide,
3-(1-ethyl-2-methylindole-3-yl)-3-(2-methyl-4-diethylaminophenyl)-7-azaphthalide,
3-(1-ethyl-2-methylindole-3-yl)-3-(4-diethylaminophenyl)-4-azaphthalide,
3-(l-ethyl-2-methylindole-3-yl)-3-(4-N-n-amyl-N-methylaminophenyl)-4-azaphthalide,
3-(1-methyl-2-methylindole-3-yl)-3-(2-hexyloxy-4-diethylaminophenyl)-4-azaphthalide,
3,3-bis(2-ethoxy-4-diethylaminophenyl)-4-azaphthalide, and
3,3-bis(2-ethoxy-4-diethylaminophenyl)-7-azaphthalide.

The recording layer of the recording material in the present invention may include one or more conventional coloring agents together with the coloring agent mentioned above. Specific examples of such coloring agents include the following compounds.

2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-dimethylanilino)fluoran,
2-benzylamino-6-(N-ethyl-2,4-dimethylanilino)fluoran,
2-dibenzylamino-6-(N-methyl-p-toluidino)fluoran,
2-dibenzylamino-6-(N-ethyl-p-toluidino)fluoran,
2-(di-p-methylbenzylamino)-6-(N-ethyl-p-toluidino)fluoran,
2-(α-phenylethylamino)-6-(N-ethyl-p-toluidino)fluoran,
2-methylamino-6-(N-methylanilino)fluoran,
2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-ethyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran,
2-amino-6-(N-methylanilino)fluoran,
2-amino-6-(N-ethylanilino)fluoran,
2-amino-6-(N-propylanilino)fluoran,
2-amino-6-( N-methyl-p-toluidino)fluoran,
2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran,
2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran,
1,2-benzo-6- (N-ethyl-N-isoamylamino)fluoran,
1,2-benzo-6-dibutylaminofluoran,
1,2-benzo-6-(N-ethyl-N-cyclohexylamino)fluoran, and
1,2-benzo-6-(N-ethyl-N-toluidino)fluoran. Specific examples of the other coloring agents for use in the present invention include the following compounds.

2-anilino-3-methyl-6-(N-2-ethoxypropyl-N-ethylamino)fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-methyl-p-toluidino)fluoran,
2-dibenzylamino-4-methyl-6-diethylaminofluoran,
2-dibenzylamino-4-methoxy-6-(N-methyl-p-toluidino)fluoran,
2-dibenzylamino-4-methyl-6-(N-ethyl-p-toluidino)fluoran,
2-(α-phenylethylamino)-4-methyl-6-diethylaminofluoran,
2-(p-toluidino)-3-(t-butyl)-6-(N-methyl-p-toluidino)fluoran,
2-(o-methoxycarbonylanilino)-6-diethylaminofluoran,
2-acetylamino-6-(N-methyl-p-toluidino)fluoran,
4-methoxy-6-(N-ethyl-p-toluidino)fluoran,
2-ethoxyethylamino-3-chloro-6-dibutylaminofluoran,
2-dibenzylamino-4-chloro-6-(N-ethyl-p-toluidino)fluoran,
2-(α-phenylethylamino)-4-chloro-6-diethylaminofluoran,
2-(N-benzyl-p-trifluoromethylanilino)-4-chloro-6-diethylaminofluoran,
2-anilino-3-methyl-6-pyrrolidinofluoran,
2-anilino-3-chloro-6-pyrrolidinofluoran,
2-anilino-3-methyl-6-(N-ethyl-N-tetrahydrofurfurylamino)fluoran,
2-mesidino-4',5'-benzo-6-diethylaminofluoran,
2-(m-trifluoromethylanilino)-3-methyl-6-pyrrolidinofluoran,
2-(α-naphthylamino)-3,4-benzo-4'-bromo-6-(N-benzyl-N-cyclohexylamino)fluoran,
2-piperidino-6-diethylaminofluoran,
2-(N-n-propyl-p-trifluoromethylanilino)-6-morpholinofluoran,
2-(di-N-p-chlorophenyl-methylamino)-6-pyrrolidinofluoran,
2-(N-n-propyl-m-trifluoromethylanilino)-6-morpholinofluoran,
1,2-benzo-6-(N-ethyl-N-n-octylamino)fluoran,
1,2-benzo-6-diallylaminofluoran,
1,2-benzo-6-(N-ethoxyethyl-N-ethylamino)fluoran,
benzoleucomethyleneblue,
2-[3,6-bis(diethylamino)]-6-(o-chloroanilino)xanthyl benzoic acid lactam,
2-[3,6-bis(diethylamino)]-9-(o-chloroanilino)xanthyl benzoic acid lactam,
3,3-bis(p-dimethylaminophenyl)phthalide,
3,3-bis(p-dimethylaminophenyl)-6-dimethylaminophthalide (i.e., crystal violet lactone)
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-(2-methoxy-4-dimethylaminophenyl)-3-(2-hydroxy-4,5-dichlorophenyl)phthalide, 3-(2-hydroxy-4-dimethylaminophenyl)-3-(2-methoxy-5-chlorophenyl)phthalide, 3-(2-hydroxy-4-dimethoxyaminophenyl)-3-(2-methoxy-5-chlorophenyl)phthalide, 3-(2-hydroxy-4-dimethylaminophenyl)-3-(2-methoxy-5-nitrophenyl)phthalide, 3-(2-hydroxy-4-diethylaminophenyl)-3-(2-methoxy-5-methylphenyl)phthalide, 3-(2-methoxy-4-dimethylaminophenyl)-3-(2-hydroxy-4-chloro-5-methoxyphenyl)phthalide, 3,6-bis(dimethylamino)fluorenespiro(9,3')-6'-dimethylaminophthalide, 6'-chloro-8'-methoxy-benzoindolino-spiropyran, and 6'-bromo-2'-methoxy-benzoindolino-spiropyran.

The content of the color formation/erasure controlling agent in the recording layer is preferably from about 0.1 to about 300 parts by weight, and more preferably from about 1 to about 100 parts by weight, per 100 parts by weight of the color developer included in the recording layer. The coloring agent and the color developer may be included in microcapsules.

The recording layer preferably includes a crosslinked resin to obtain good heat resistance.

A crosslinked resin can be obtained by, for example, heating a mixture of a crosslinking agent and a crosslinking resin having an active group which can react with the crosslinking agent upon application of heat.

Specific examples of such a heat-crosslinking resin include resins having an active group such as a hydroxy group, a carboxy group and the like, e.g., phenoxy resins, polyvinyl butyral resins, cellulose acetate propionate and cellulose acetate butyrate. In addition, a copolymer of a monomer having an active group such as a hydroxy group, a carboxyl group or the like and a monomer such as vinyl chloride, an acrylic monomer, styrene or the like can be employed. Specific examples of such a copolymer include vinyl chloride-vinyl acetate-vinyl alcohol copolymers, vinyl chloride-vinyl acetate-hydroxypropyl acrylate copolymers, vinyl chloride-vinyl acetate-maleic anhydride copolymers and the like.

Suitable crosslinking agents which can crosslink these resins upon application of heat include isocyanate compounds, amino resins, phenol resins, amines, epoxy compounds and the like. For example, specific examples of such isocyanate compounds include poly isocyanate compounds having a plurality of isocyanate groups such as hexamethylene diisocyanate (HDI), tolylene diisocyanate (TDI), xylylene diisocyanate (XDI), and adducts of these isocyanate compounds with trimethylol propane and the like, buret type compounds of these isocyanate compounds, isocyanurate type compounds of these isocyanate compounds and blocked isocyanate compounds of these isocyanate compounds.

As for the addition quantity of the crosslinking agents, the ratio of the number of active groups included in the resin to the number of functional groups included in the crosslinking agent is preferably from about 0.01 to about 2 to maintain good heat resistance and good image formation/erasure properties of the recording material.

In addition, the recording layer may include a crosslinking promoter, which is a catalyst useful for this kind of reaction, for example, tertiary amines such as 1,4-diazabicyclo[2,2,2] octane, and metal compounds such as organic tin compounds.

Crosslinking can also be effected by application of an electron beam or ultraviolet light. Suitable monomers useful for forming a crosslinked recording layer upon application of electron beam or ultraviolet light include the following monomers, but are not limited thereto.

monomers having one functional group methyl methacrylate, ethyl methacrylate, n-butyl methacrylate, iso-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, methacrylic acid, 2-hydroxyethyl methacrylate, 2-hydroxypropyl methacrylate, dimethylaminoethyl methacrylate, methyl chloride salts of dimethylaminoethyl methacrylate, diethylaminoethyl methacrylate, glycidyl methacrylate, tetrahydrofurfuryl methacrylate, allyl methacrylate, 2-ethoxyethyl methacrylate, 2-ethylhexyl acrylate, 2-ethoxyethyl acrylate, 2-ethoxyethoxyethyl acrylate, 2-hydroxyethyl acrylate, 2-hydroxypropyl acrylate, dicyclopentenylethyl acrylate, N-vinyl pyrrolidone and vinyl acetate.

monomers having two functional groups ethylene glycol dimethacrylate, triethylene glycol dimethacrylate, tetraethylene glycol dimethacrylate, 1,3-butylene glycol dimethacrylate, 1,6-hexanediol dimethacrylate, 1,4-butanediol diacrylate, 1,6-hexanediol diacrylate, 1,9-nonanediol diacrylate, neopentyl glycol diacrylate, tetraethylene glycol diacrylate, tripropylene glycol diacrylate, polypropylene glycol diacrylate, diacrylate esters of an adduct of bisphenol A with ethylene oxide, glycerin methacrylate acrylate, diacrylate esters of an adduct of neopentyl glycol with two moles of propylene oxide, diethylene glycol diacrylate, polyethylene glycol (400) diacrylate, diacrylate esters of an ester of hydroxy pivalate and neopentyl glycol, 2,2-bis(4-acryloyloxydiethoxyphenyl) propane, neopentyl glycol diadipate diacrylate, diacrylate esters of an adduct of neopentyl glycol hydroxypivalate with ε-caprolactone, 2-(2-hydroxy-1,1-dimethylethyl)-5-hydroxymethyl-5-ethyl-1,3-dioxane diacrylate, tricyclodecane dimethylol diacrylate, adducts of tricyclodecane dimethylol diacrylate with ε-caprolactone, and 1,6-hexanediol glycidyl ether diacrylate.

monomers having three or more functional groups trimethylol propane trimethacrylate, trimethylol propane triacrylate, acrylate esters of an adduct of glycerin with propylene oxide, trisacryloyloxyethyl phosphate, pentaerythritol acrylate, triacrylate esters of an adduct of trimethylol propane with three moles of propylene oxide, dipentaerythritol polyacrylate, polyacrylate esters of an adduct of dipentaerythritol with ε-caprolactone, dipentaerythritol propionate triacrylate, triacrylate esters of hydroxypivalic aldehyde modified dimethylol propane, dipentaerythritol propionate tetraacrylate, ditrimethylol propane tetraacrylate, dipentaerythritol propionate pentaacrylate, dipentaerythritol hexaacrylate and adducts of dipentaerythritol hexaacrylate with ε-caprolactone.

oligomers adducts of bisphenol A with diepoxy acrylic acid.

The ratio of the coloring composition (the coloring agent and color developer) to the resin in the recording layer is preferably from about 0.1/1 to 10/1 by weight to obtain good heat resistance of the recording layer and good image density.

When a resin is crosslinked using ultraviolet light, one or more of the following photopolymerization initiators and photopolymerization promoters can be used in the recording layer.

Specific examples of such photopolymerization initiators include:

benzoin ethers such as isobutyl benzoin ether, isopropyl benzoin ether, benzoin ethyl ether and benzoin methyl ether;

α-acyloxime esters such as 1-phenyl-1,2-propanedione-2-(o-ethoxycarbonyl)oxime; benzyl ketals such as 2,2-dimethoxy-2-phenyl acetophenone and benzyl hydroxycyclohexylphenyl ketone; acetophenone derivatives such as diethoxy acetophenone and 2-hydroxy-2-methyl-1-phenylpropane-1-one; and ketones such as benzophenone, 1-chlorothioxanthone, 2-chlorothioxanthone, isopropylthioxanthone, 2-methylthioxanthone and 2-chlorobenzophenone. These photopolymerization initiators are employed alone or in combination.

The content of the photopolymerization initiator in the recording layer is preferably from about 0.005 to about 1.0 part by weight, and more preferably from about 0.01 to about 0.5 part by weight, per 1 part by weight of the monomer or the oligomer.

Suitable photopolymerization promoters include aromatic tertiary amines and aliphatic amines. Specific examples of such photopolymerization promoters which are employed alone or in combination include p-dimethylamino benzoic acid isoamyl ester, p-dimethylamino benzoic acid ethyl ester and the like. The content of the photopolymerization promoter in the recording layer is preferably from about 0.1 to about 5 parts by weight, and more preferably from about 0.3 to about 3 parts by weight, per 1 part by weight of the photopolymerization initiator.

The recording layer of the recording material of the present invention may include auxiliary agents to improve or control the coating properties and the color formation/erasure properties. Specific examples of such auxiliary agents include dispersants, surfactants, electroconductive agents, fillers, lubricants, antioxidants, photostabilizers, ultraviolet light absorbing agents, color formation stabilizers, and color erasure promoters.

The recording layer may include a binder resin to uniformly disperse the reversible thermosensitive coloring material in the recording layer. The binder resin preferably has a resistance to heat applied to the recording layer for forming or erasing images. Specific examples of such a binder resin include polyvinyl chloride resins, polyvinyl acetate resins, vinyl chloride-vinyl acetate copolymers, polystyrene resins, styrene copolymers, phenoxy resins, polyester resins, aromatic polyester resins, polyurethane resins, polycarbonate resins, polyacrylate resins, polymethacrylate resins, acrylic copolymers, maleic anhydride copolymers, polyvinyl alcohol resins, modified polyvinyl alcohol resins, hydroxyethyl cellulose resins, carboxymethyl cellulose resins, starches, and the like.

The recording layer can be formed, for example, by the following method:

(1) A coloring agent, a color developer, a color formation/erasure controlling agent, a crosslinking resin and a solvent are mixed. Specific examples of such solvent include water; alcohols such as methanol, ethanol, isopropanol, n-butanol, and methylisocarbinol; ketones such as acetone, 2-butanone, ethyl amyl ketone, diacetone alcohols, isophorone, and cyclohexanone; amides such as N,N-dimethylformamide, and N,N-dimethylacetoamide; ethers such as diethyl ether, diisopropyl ether, tetrahydrofuran, 1,4-dioxane, and 3,4-dihydro-2H-pyran; glycol ethers such as 2-methoxy ethanol, 2-ethoxy ethanol, 2-butoxy ethanol, and ethylene glycol dimethyl ether; esters such as methyl acetate, ethyl acetate, isobutyl acetate, amyl acetate, ethyl lactate, and ethylene carbonate; aromatic hydrocarbons such as benzene, toluene, and xylene; aliphatic hydrocarbons such as hexane, heptane, iso-octane, and cyclohexane; halogenated hydrocarbons such as methylene chloride, 1,2-dichloroethane, dichloropropane, and chlorobenzene; sulfoxides such as dimethylsulfoxide; pyrrolidones such as N-methyl-2-pyrrolidone and N-octyl-2-pyrrolidone.

(2) The mixture is dispersed with a dispersing apparatus such as paint shakers, ballmills, attritors, three-roll mills, Kedy mills, sand mills, Dyno mills, colloid mills or the like, to prepare a recording layer coating liquid. Each component may be dispersed or dissolved in a solvent and then the dispersions and/or solutions may be mixed to prepare a coating liquid. In addition, one or more components are dissolved in a hot solvent and then cooled to deposit particles of the component or components.

(3) The coating liquid is coated on a substrate by a known coating method such as blade coating, wire bar coating, spray coating, air knife coating, bead coating, curtain coating, gravure coating, kiss coating, reverse roll coating, dip coating, die coating or the like.

(4) The coated recording layer is dried, and if necessary, heated, and/or subjected to ultraviolet or electron beam radiation treatment, to be crosslinked.

Suitable light sources useful for irradiating ultraviolet light include mercury-vapor lamps, metal-halide lamps, gallium lamps, mercury-xenon lamps, flashing lamps and the like. The light source should be selected so that the spectrum of the ultraviolet light irradiated from the light source corresponds to the absorption spectrum of the photopolymerization initiator and the photopolymerization promoter included in the recording layer. Irradiation conditions of ultraviolet light such as output of lamp power, irradiation width and feeding speed (i.e., irradiation time) should be determined so that the resin in the recording layer can be securely crosslinked.

As for electron beam irradiation apparatus, scanning type and non-scanning type electron beam irradiation apparatus can be used. The electron beam irradiating apparatus is selected depending on the irradiation area and the irradiation dose required for crosslinking the recording layer. Irradiation conditions such as electron beam current, irradiation width and irradiation speed should be determined depending on the irradiation dose required for crosslinking the resin included in the recording layer.

The recording layer can be crosslinked by a heat crosslinking method, an ultraviolet light crosslinking method or an electron beam crosslinking method. Crosslinking conditions depend on the material of the crosslinking resin used in the recording layer. For example, the recording layer can be crosslinked upon application of high temperature heat for a short time or can be crosslinked upon application of low temperature heat for a long time.

The thickness of the recording layer is preferably from about 1 to about 20 μm, and more preferably from about 3 to about 10 μm.

The recording material of the present invention may include a protective layer formed overlying the recording layer. The protective layer preferably includes a resin such as polyvinyl alcohol resins, styrene-maleic anhydride copolymers, carboxyl modified polyethylene resins, melamine-formaldehyde resins, urea-formaldehyde resins, and crosslinking resins which can be crosslinked upon application of heat, ultraviolet light, electron beam, or the like. By providing such a protective layer, the recording material has good ability to be used with thermal printheads and good durability even when the recording material is repeatedly used for a long time.

Suitable crosslinking resins for use in the protective layer include the crosslinking resins which are described above for use in the recording layer.

The protective layer may include auxiliary agents such as electroconductive agents; stick-preventing agents, e.g., cationic polymers, silicone resins, fluorine-containing resins, phosphate compounds and polyoxyethylene compounds; fillers and lubricants which improve the feeding properties and the wearing resistance of the recording material and which prevent the recording material from sticking to a thermal printhead; ultraviolet absorbing agents; and the like. The thickness of the protective layer is preferably from about 0.1 to about 20 μm, and more preferably from about 0.3 to about 10 μm.

The recording material of the present invention may include an adhesive layer, an intermediate layer, an under-coat layer, a back-coat layer and a magnetic recording layer other than the recording layer and the protective layer. These layers may be colored or non-colored. The magnetic recording layer may be formed on the side of a substrate on which the recording layer is formed or on the opposite side of the substrate.

An intermediate layer is preferably formed between the recording layer and the protective layer to obtain good adhesion thereof and to prevent the recording layer from deteriorating, which is caused by contacting with a protective layer coating liquid and the migration of a component included in the protective layer. The intermediate layer and the protective layer preferably have relatively low oxygen transmittance to obtain good light resistance of the recorded image by preventing the coloring agent and the coloring developer from oxidizing caused by contacting with oxygen.

The recording material may include an under-coat layer between the substrate and the recording layer to effectively utilize heat applied for recording images, to obtain good adhesion between the recording layer and the substrate and/or to prevent the substrate from deteriorating caused by contacting with the recording layer coating liquid. The heat insulating under-coat layer can be formed by coating a coating liquid in which hollow particles are dispersed in a resin solution.

Suitable resins for use in the intermediate layer or the under-coat layer include resins which are described above for use in the recording layer. In addition, the recording layer, protective layer, intermediate layer and under-coat layer of the recording material of the present invention may include a filler such as inorganic or organic fillers.

Specific examples of the inorganic fillers for use in the present invention include carbonates such as calcium carbonate, magnesium carbonate; silicates such as silicic acid anhydride, silicic acid hydrate, aluminum silicate hydrate, and calcium silicate hydrate; hydroxides such as aluminum hydroxide and iron hydroxide; metal oxides such as zinc oxide, indium oxide, alumina, silica, zirconia, tin oxide, ceriumoxide, iron oxide, antimony oxide, barium oxide, calcium oxide, bismuth oxide, nickel oxide, magnesium oxide, chromium oxide, manganese oxide, tantalum oxide, niobium oxide, thorium oxide, hafnium oxide, molybdenum oxide, iron ferrites, nickel ferrites, cobalt ferrites, barium titanate, and potassium titanate; sulfides or sulfates such as zinc sulfide and barium sulfate; metal carbides such as titanium carbide, silicon carbide, molybdenum carbide, tungsten carbide, and tantalum carbide; metal nitrides such as aluminum nitride, silicon nitride, boron nitride, zirconium nitride, vanadium nitride, titanium nitride, niobium nitride, and gallium nitride. Specific examples of the organic fillers for use in the present invention include powders of resins such as silicone resins, cellulose resins, epoxy resins, nylon resins, phenolic resins, urethane resins, urea resins, melamine resins, polyester resins, polycarbonate resins, styrene resins such as polystyrene, styrene-isoprene copolymers, and styrene-vinyl benzene copolymers; acryl resins, such as vinylidene chloride-acryl copolymers, acryl-urethane copolymers, ethylene-acryl copolymers, polyethylene resins, formaldehyde resins such as benzoguanamine-formaldehyde resins, and melamine-formaldehyde resins; polymethyl methacrylate resins, vinyl chloride resins and the like.

These fillers can be used alone or in combination. The shape of the filler is not particularly limited, and may be sphere, plate, needle, and irregular shapes.

The undercoat layer, recording layer, intermediate layer, protective layer of the present invention may include a lubricant. Specific examples of such a lubricant include synthetic waxes such as ester waxes, paraffin waxes, and polyethylene waxes; vegetable waxes such as hardened castor oil; animal waxes such as hardened beef tallow; higher alcohols such as stearyl alcohol and behenyl alcohol; higher fatty acids such as margaric acid, lauric acid, myristic acid, palmitic acid, stearic acid, behenic acid, and cerotic acid; higher fatty acid esters such as sorbitan fatty acid esters; amides such as stearic acid amide, oleic acid amide, lauric acid amide, ethylenebisstearamide, methylenebisstearamide, and methylolstearamide; and the like.

The content of the lubricant in the layers is preferably from about 0.1 to about 95% by volume, and more preferably from about 1 to about 75% by volume.

The intermediate layer and/or the protective layer of the present invention may include an ultraviolet absorbing agent.

Specific examples of such ultraviolet absorbing agent include the following compounds:

benzotriazole compounds such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)benzotriazole, 2-(2'-hydroxy-5'-octoxyphenyl)benzotriazole, 2-(2'-hydroxy-3',5'-di-t-butylphenyl)-5-chlorobenzotriazole, and 2-(2'-hydroxy-5'-ethoxyphenyl)benzotriazole; benzophenone compounds such as 2,4-dihydroxybenzophenone, 2-hydroxy-4-methoxybenzophenone, 2-hydroxy-4-n-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxy-2'-carboxybenzophenone, 2-hydroxy-4-oxybenzylbenzophenone, 2-hydroxy-4-chlorobenzophenone, 2-hydroxy-4-methoxybenzophenone-5-sulfonic acid, 2-hydroxy-4-methoxybenzophenone-5-sulfonic acid sodium salt, 2,2'-dihydroxy-4,4'-dimethoxybenzophenone-sulfonic acid sodium salt; salicylate compounds such as phenyl salicylate, p-octylphenyl salicylate, p-t-butylphenyl salicylate, carboxyphenyl salicylate, methylphenyl salicylate, dodecylphenyl salicylate, 2-ethylhexylphenyl salicylate, and homomenthylphenyl salicylate; cyano acrylate compounds such as 2-ethylhexyl-2-cyano-3,3'-diphenyl acrylate, and ethyl-2-cyano-3,3'-diphenyl acrylate; p-aminobenzoic acid compounds such as p-aminobenzoic acid, glyceryl p-aminobenzoate, amyl p-dimethylaminobenzoate, and ethyl p-dihydroxypropylbenzoate; cinnamic acid compounds such as 2-ethylhexyl p-methoxycinnamate, and 2-ethoxyethyl p-methoxycinnamate; 4-t-butyl-4'-methoxydibenzoylmethane, urocanic acid, ethyl urocanate, and the like.

The intermediate layer and the protective layer can be formed by the method mentioned above for use in the recording layer.

A suitable substrate for use in the recording material of the present invention includes any substrate, which can support the layers, such as paper, resin films, synthetic paper, metal foils, glass plates or complex substrates thereof. The substrate may be non-colored or colored and may be transparent or opaque. The substrate may be a complex substrate in which two or more substrates are combined. Suitable thickness of the substrate is from a few $\mu$m to a few mm.

The recording material of the present invention may be adhered to a supporting material with an adhesive layer therebetween. The adhesive layer may be formed on a part of the recording material or on the entire recording material. The recording material, which is adhered to a supporting material, may be laminated with films or the like.

The recording material of the present invention can be processed into any shape such as sheet, card, roll and the like.

In addition, the recording material of the present invention may have a print layer thereon. The print layer can be formed, for example, by offset printing, gravure printing, ink jet printing, thermal transfer printing, sublimation thermal transfer printing or the like. Further, the print layer and the recording material having the print layer may be covered entirely or partially by a protective layer (an overprint layer, i.e., an OP layer) which includes a crosslinked resin. Furthermore, the recording material of the present invention may include an irreversible thermosensitive recording layer. The colors of the images of the irreversible thermosensitive recording layer and the reversible thermosensitive recording layer may be the same or different from each other.

Images can be recorded in the recording material of the present invention by heating the recording material, for example, with a thermal printhead, a thermal pen, laser or the like, at a temperature not lower than the coloring temperature T1 for a short time. When heating using such a device is stopped, the applied heat is quickly diffused, namely, the recorded image is quickly cooled; thereby a stable image can be formed in the recording material. On the contrary, the recorded image can be erased by heating the recording layer at a temperature not lower than the coloring temperature T1 of the coloring composition in the recording layer with an appropriate heating device and then gradually cooling the recording layer, or by heating the recording layer at a temperature in an erasing temperature range, i.e., a temperature not lower than the erasing temperature T2 but lower than the coloring temperature T1. The latter image erasing method is preferable because images can be rapidly erased. In addition, the recorded image can be also erased by heating a wide area of the recording layer or heating the recording layer for a long time and then cooling the recording layer. This is because in each case the recording layer is gradually cooled. Suitable heating devices useful for erasing images include heaters such as a ceramic heater, a plane heater, a heat bar, a heat roller or heat stamp; hot air blowing devices; or thermal printheads. When a thermal printhead is used for erasing images, the heat energy applied to the recording layer is preferably controlled so as to be relatively low compared to the heat energy for image recording by controlling the applied voltage and/or pulse width of a pulse applied to the thermal printhead. By using this method, the image recording and erasing operations can be performed with only one thermal printhead, which allows the so-called "overwriting". Needless to say, images can be erased by heating the recording layer at a temperature in an erasing temperature range with a heater such as ceramic heaters, plane heaters, heat bars, heat rollers or heat stamps.

Having generally described this invention, a further understanding can be obtained by reference to certain specific examples which are provided herein for purposes of illustration only and are not intended to be limiting. In the descriptions in the following examples, numbers represent weight ratios in parts, unless otherwise specified.

EXAMPLES

Example 1

(Formulation of thermosensitive coloring composition)

| | |
|---|---|
| Composition (1) | |
| 2-anilino-3-methyl-6-dibutylaminofluoran (coloring agent) | 1 mole |
| Color developer No. 1 shown in Table 5 | 2 moles |

Thermosensitive coloring composition (1) was prepared by mixing the coloring agent and color developer described above using a mortar.

The composition was put on a glass plate 1.2 mm thick, which was heated at 200° C. with a hot plate, so that the composition was melted.

The melted composition was covered with a cover glass plate so that a thin layer of the melted composition was formed between the glass plate and the cover glass.

The composition, which was sandwiched between the glass plate and cover glass, was then dipped into ice water to be rapidly cooled. After cooling, the composition was taken out from the ice water and then the glass plate and cover glass were removed from the composition to prepare a film of the composition (1) (referred to as a film (1)). Water adhered to the film (1) was also removed. The film (1) had a black color. When the film (1) was set on a hot plate which was heated at an erasing temperature of the composition (1), which is described in Table 6, the film was instantaneously decolored. When the decolored film (1) was set on a hot plate which was heated at 200° C., the film (1) colored black again. Thus, the film (1) had reversible thermosensitive coloring properties.

The procedures for preparation of the composition (1) and for evaluation of the reversible thermosensitive properties thereof were repeated except that the formulation of the composition (1) was replaced with each of the compositions (2) to (7) described below.

| | |
|---|---|
| Composition (2) | |
| 2-anilino-3-methyl-6-dibutylaminofluoran (coloring agent) | 1 mole |
| Color developer No. 2 shown in Table 5 | 2 moles |
| Composition (3) | |
| 2-anilino-3-methyl-6-dibutylaminofluoran (coloring agent) | 1 mole |
| Color developer No. 3 shown in Table 5 | 2 moles |
| Composition (4) | |
| 2-anilino-3-methyl-6-dibutylaminofluoran (coloring agent) | 1 mole |
| Color developer No. 4 shown in Table 5 | 2 moles |
| Composition (5) | |
| 2-anilino-3-methyl-6-dibutylaminofluoran (coloring agent) | 1 mole |
| Color developer No. 5 shown in Table 5 | 2 moles |
| Composition (6) | |
| 2-anilino-3-methyl-6-dibutylaminofluoran (coloring agent) | 1 mole |
| Color developer No. 6 shown in Table 5 | 2 moles |

-continued

| Composition (7) | |
|---|---|
| 2-anilino-3-methyl-6-dibutylaminofluoran (coloring agent) | 1 mole |
| Color developer No. 7 shown in Table 5 | 2 moles |

The films (2) to (7) also had reversible thermosensitive coloring properties.

TABLE 5

No. 1

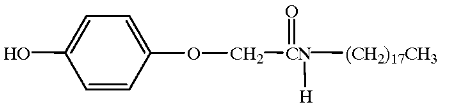

No. 2

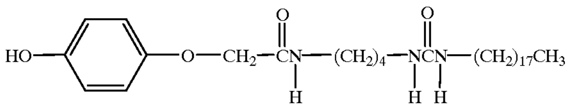

No. 3

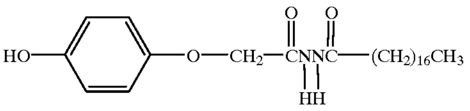

No. 4

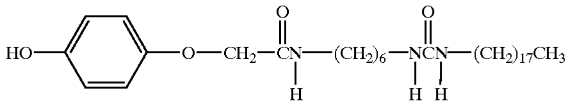

No. 5

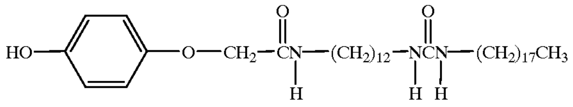

No. 6

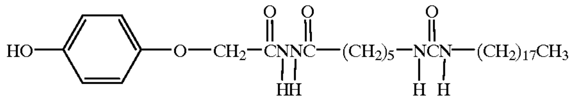

No. 7

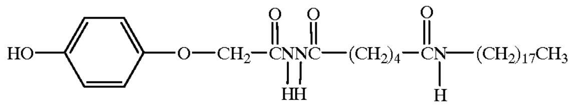

Example 2-1

A mixture of the following components were mixed and pulverized using a ball mill so that the particle diameter of the solid components in the liquid was from 1 to 4 μm. Thus, a recording layer coating liquid was prepared.

(Formulation of recording layer coating liquid)

| | |
|---|---|
| 2-anilino-3-methyl-6-dibutylaminofluoran (coloring agent) | 2 |
| Color developer No. 1 shown in Table 5 | 8 |
| Vinyl chloride-vinyl acetate copolymer (VYHH, manufactured by Union Carbide Corp.) | 20 |
| Methyl ethyl ketone | 45 |
| Toluene | 45 |

The recording layer coating liquid was coated on a polyester film having a thickness of 100 μm with a wire bar, and then dried to form a recording layer having a thickness of about 6.0 μm. Thus, a reversible thermosensitive recording material of the present invention was prepared.

Example 2-2

The procedure for preparation of the reversible thermosensitive recording material in Example 2-1 was repeated except that the color developer was replaced with the color developer No. 2 shown in Table 5. Thus, a reversible thermosensitive recording material of the present invention was prepared.

Example 2-3

The procedure for preparation of the reversible thermosensitive recording material in Example 2-1 was repeated except that the color developer was replaced with the color developer No. 3 shown in Table 5. Thus, a reversible thermosensitive recording material of the present invention was prepared.

Example 2-4

The procedure for preparation of the reversible thermosensitive recording material in Example 2-1 was repeated except that the color developer was replaced with the color developer No. 4 shown in Table 5. Thus, a reversible thermosensitive recording material of the present invention was prepared.

Example 2-5

The procedure for preparation of the reversible thermosensitive recording material in Example 2-1 was repeated except that the color developer was replaced with the color developer No. 5 shown in Table 5. Thus, a reversible thermosensitive recording material of the present invention was prepared.

Example 2-6

The procedure for preparation of the reversible thermosensitive recording material in Example 2-1 was repeated except that the color developer was replaced with the color developer No. 6 shown in Table 5. Thus, a reversible thermosensitive recording material of the present invention was prepared.

Example 2-7

The procedure for preparation of the reversible thermosensitive recording material in Example 2-1 was repeated except that the color developer was replaced with the color developer No. 7 shown in Table 5. Thus, a reversible thermosensitive recording material of the present invention was prepared.

Comparative Example 1

The procedure for preparation of the reversible thermosensitive recording material in Example 2-1 was repeated except that the color developer was replaced with eicosylphosphonic acid and the coloring agent was replaced with 2-anilino-3-methyl-6-(N-ethyl-N-p-tolylamino)fluoran. Thus, a comparative reversible thermosensitive recording material was prepared.

Comparative Example 2

The procedure for preparation of the reversible thermosensitive recording material in Example 2-1 was repeated except that the color developer was replaced with N-(4-hydroxyphenyl)-N'-n-octadecyl urea. Thus, a comparative reversible thermosensitive recording material was prepared.

The reversible thermosensitive recording materials of the present invention in Examples 2-1 to 2-7 and the comparative reversible thermosensitive recording materials in Comparative Examples 1 and 2 were evaluated with respect to the following items.

(1) Initial ground density

Density of each non-colored recording material, i.e., the initial ground density, was measured before a first recording operation with a Macbeth reflection densitometer RD-914.

(2) Image density after first recording operation

Images were recorded on each non-colored recording material with a thermal printhead. Recording conditions are as follows:

| | |
|---|---|
| Dot density of the thermal printhead: | 8 dots/mm |
| Applied voltage: | 13.3 V |
| Pulse width: | 1.2 ms |

Image density after first recording operation were measured with a Macbeth reflection densitometer RD-914.

(3) Density after first erasure

The images recorded in (1) were heated for 1 second at a temperature described in Table 5 using a heat gradient tester, to be erased. The density of the decolored parts of the recording materials were measured with a Macbeth reflection densitometer RD-914.

(4) Image density and density after ten image formation/erasure operations

Image density and density after ten image formation/erasure operations were also measured with a Macbeth reflection densitometer RD-914. The conditions of the image formation/erasure operations were the same as those mentioned above in (2).

(5) Preservability of image

The images of the recording materials were preserved in a box for 24 hours at 50° C. The image density and the ground density before and after the test were measured with a Macbeth reflection densitometer RD-914. Then the image density retention rate, which is defined as follows, was obtained to evaluate the preservability of the recorded images.

$$\text{Image density retention rate } (\%)=\{(IDa-GDa)/(IDb-GDb)\}\times 100$$

wherein IDa and GDa represent an image density and ground density of an image after the test, and IDb and GDb represent an image density and ground density of the image before the test.

The results are shown in Table 6.

TABLE 6

| | Image erasing temp. (° C.) | Initial ground density | First image formation/erasure operation: Image density | First image formation/erasure operation: Density after erasure | Tenth image formation/erasure operation: Image density | Tenth image formation/erasure operation: Density after erasure | Image density retention rate (%) |
|---|---|---|---|---|---|---|---|
| EX. 2-1 | 80 | 0.10 | 0.90 | 0.11 | 0.91 | 0.11 | 97 |
| EX. 2-2 | 130 | 0.10 | 0.97 | 0.10 | 0.98 | 0.10 | 100 |
| EX. 2-3 | 130 | 0.11 | 0.98 | 0.11 | 0.99 | 0.11 | 98 |
| EX. 2-4 | 120 | 0.10 | 0.95 | 0.10 | 0.94 | 0.11 | 100 |
| EX. 2-5 | 120 | 0.10 | 0.94 | 0.11 | 0.94 | 0.10 | 98 |
| EX. 2-6 | 150 | 0.11 | 0.96 | 0.11 | 0.97 | 0.10 | 99 |
| EX. 2-7 | 140 | 0.10 | 0.98 | 0.11 | 0.96 | 0.10 | 99 |
| Comparative EX. 1 | 80 | 0.15 | 1.10 | 0.45* | 1.08 | 0.48 | 35 |
| Comparative EX. 2 | 120 | 0.12 | 1.01 | 0.11 | 1.02 | 0.12 | 21 |

*The image was not erased when the recording material was heated for 1 second. In order to erase the image such that the density after erasure was 0.16, which was almost the same as the initial ground density of the recording material, the recording material had to be heated for 1 minute.

The results in Table 6 clearly indicate that the recording materials of the present invention can produce good images even when images were repeatedly recorded and erased. In addition, the results clearly indicate that the images produced by the recording materials of the present invention have high image density retention rate, i.e., good preservability.

Example 3

A mixture of the following components were mixed and pulverized using a ball mill so that the particle diameter of the solid components in the liquid was from 0.1 to 3 μm.

| | |
|---|---|
| 2-anilino-3-methyl-6-dibutylaminofluoran (coloring agent) | 2 |
| Color developer No. 2 shown in Table 5 | 8 |
| Color formation/erasure controlling agent having the following formula $CH_3(CH_2)_{17}NHCONH(CH_2)_5CH_3$ | 3 |
| Tetrahydrofuran solution of acrylpolyol resin (solid content of 15%) | 70 |

Ten parts of a crosslinking agent, Colonate HL (adduct type hexamethylenediisocyanate, manufactured by Nippon Polyurethane Co., Ltd., ethyl acetate solution, solid content of 75%), were added to the mixture and then mixed to prepare a recording layer coating liquid.

The recording layer coating liquid was coated on a polyester film having a thickness of 188 μm with a wire bar, and then dried at 100° C. for 2 minutes and heated at 60° C. for 24 hours, to form a recording layer having a thickness of about 8.0 μm. Thus, a reversible thermosensitive recording material of the present invention was prepared.

Example 4

The procedure for preparation of the reversible thermosensitive recording material in Example 3 was repeated except that the color developer was replaced with the color developer No. 3 shown in Table 5. Thus, a reversible thermosensitive recording material of the invention was prepared.

Example 5

The procedure for preparation of the reversible thermosensitive recording material in Example 3 was repeated except that the color formation/erasure controlling agent was replaced with a compound having the following formula:

$$CH_3(CH_2)_{17}NHCO(CH_2)_4NHCO(CH_2)_{17}CH_3.$$

Thus, a reversible thermosensitive recording material of the invention was prepared.

Images were formed on each of the reversible thermosensitive recording materials in Examples 3 to 5 using a thermal recording apparatus which was manufactured by Ohkura Electric Co., Ltd. and which used a thermal printhead as the recording device. The recording conditions of the thermal printhead were 13.3 V in applied voltage and 1.2 ms in pulse width. The image density of the images was measured with a Macbeth reflection densitometer RD-914. The images were erased by heated at 110° C. for 1 second using a heat gradient tester manufactured by Toyo Seiki Co., Ltd. The density of the erased portions of the images and the ground density thereof were measured with a Macbeth reflection densitometer RD-914 to determine residual image density. The residual image density is defined as follows:

$$\text{Residual image density} = IDe - GD$$

Wherein IDe represents the density of the erased portion of an image and GD represents grond density thereof.

The results are shown in Table 7.

TABLE 7

| | Image density | Residual image density |
|---|---|---|
| Example 3 | 1.01 | 0.01 |
| Example 4 | 1.00 | 0.02 |
| Example 5 | 1.03 | 0.01 |

As can be understood from Table 7, the reversible thermosensitive recording materials of the present invention has good erasability even when images are erased at a relatively low temperature.

Example 6

A mixture of the following components were mixed and stirred to prepare a protective layer coating liquid.

| | |
|---|---|
| Ultraviolet crosslinking resin (urethane-acrylate resin, C7-157, manufactured by Dainippon Ink and Chemicals Inc.) | 15 |
| Ethyl acetate | 85 |

The protective layer coating liquid was coated on the recording layer of the recording material prepared in Example 3, and dried at 90° C. for 1 minute. The recording material having a protective layer was then fed at a speed of 9 m/min under a lamp emitting ultraviolet light of 80 W/cm. Thus, a crosslinked protective layer having a thickness of 3 μm was obtained. A reversible thermosensitive recording material of the present invention was thus prepared.

When the recording material was subjected to the above-mentioned image formation/erase operations 50 times, the recording material had good image recording/erasing properties without generating deformation in the recording layer.

Example 7

The following components were mixed to prepare an intermediate layer coating liquid.

| | |
|---|---|
| Methyl ethyl ketone solution of acrylpolyol resin (solid content of 15%) | 30 |
| 2-hydroxy-4-n-octoxybenzophenone (Viosorb 130, manufactured by Kyodo Chemical Co., Ltd.) | 4 |
| Coronate HL | 4 |

The intermediate layer coating liquid was coated on the recording layer of the recording material prepared in Example 3, and dried at 100° C. for 2 minute and heated at 60° C. for 24 hours, to form an intermediate layer having a thickness of about 2 μm. The a protective layer was formed on the intermediate layer in the same way as performed in Example 6. Thus, a reversible thermosensitive recording material of the present invention was prepared.

Example 8

The intermediate layer coating liquid prepared in Example 7 was coated on the recording layer prepared in Example 4. In addition, the protective layer was formed thereon in the same way as performed in Example 6. Thus, a reversible thermosensitive recording material of the present invention was prepared.

An image was formed on the recording materials prepared in Examples 7 and 8 by the above-mentioned image recording operation. When the images were exposed to light of 5000 lux, which was emitted from a fluorescent lamp, for 100 hours, the images kept the good image qualities. In addition, when the images, which had been exposed to light, were erased by the above-mentioned image erasing operation, the recording material achieved a non-colored state in which the images were clearly erased without a residual image.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 10-051477 and 10-152296, both filed on Feb. 17, 1998 and May 15, 1998, respectively, the entire contents of which are herein incorporated by reference.

What is claimed is:

1. A reversible thermosensitive coloring composition comprising an electron donating coloring agent and an electron accepting color developer, wherein the composition achieves a colored state when heated at a temperature not lower than a coloring temperature and then cooled at a cooling speed (a), and the composition in the colored state achieves a non-colored state when heated at a temperature lower than the coloring temperature and not lower than an erasing temperature, or when heated at a temperature not lower than the coloring temperature and then cooled relatively slowly compared to the cooling speed (a), and wherein the electron accepting color developer comprises a phenolic compound having the following formula (1):

(1)

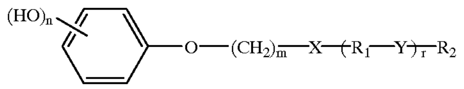

wherein n is an integer of from 1 to 3; m is an integer of from 1 to 20; r is 0 or an integer of from 1 to 3; X and Y independently represent a divalent group including a hetero atom; $R_1$ represents a hydrocarbon group having from 1 to 20 carbon atoms; and $R_2$ represents a hydrocarbon group having from 2 to 20 carbon atoms.

* * * * *